Sept. 28, 1943.  T. A. BOWERS  2,330,549
METHOD OF FABRICATING PISTON RINGS
Filed July 2, 1941     4 Sheets-Sheet 1
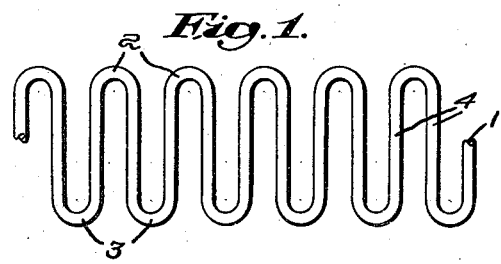
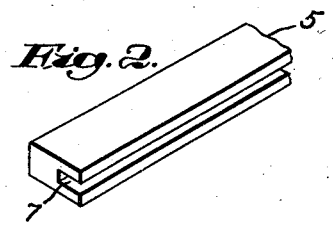
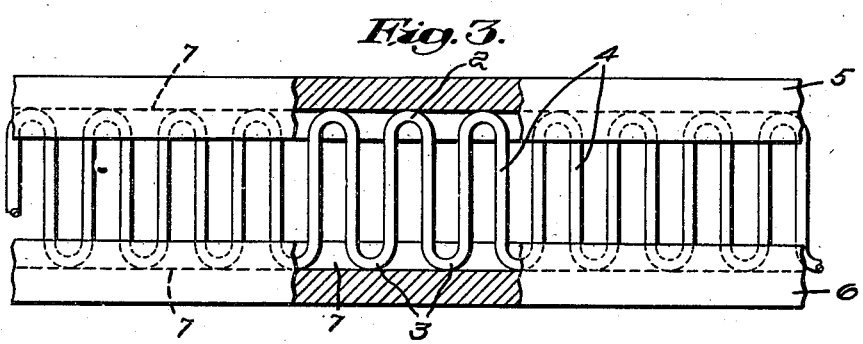
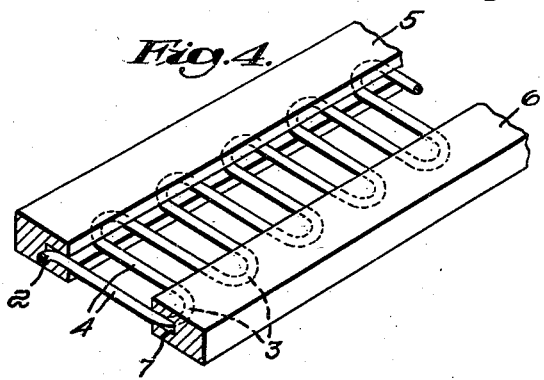
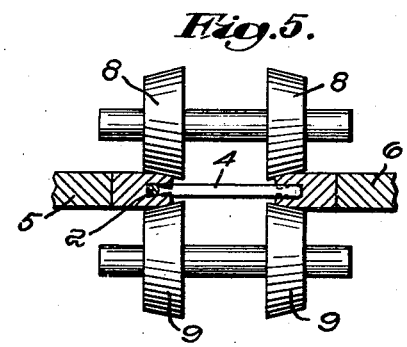
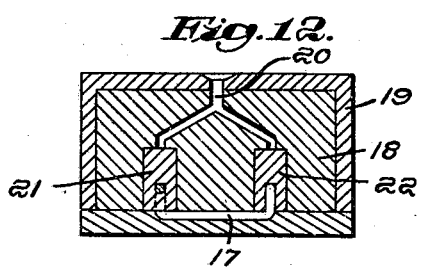
Inventor:
Thomas A. Bowers
by Thomas W. Hamilton
Attorney

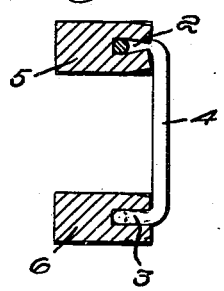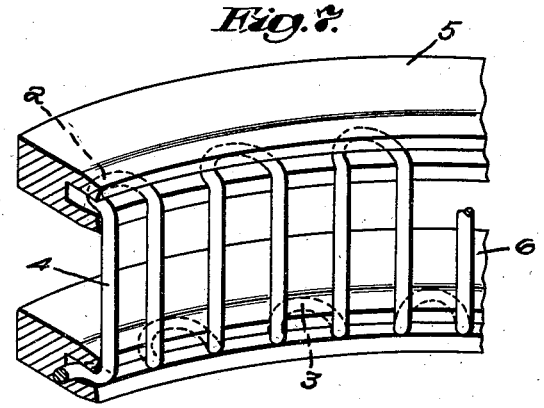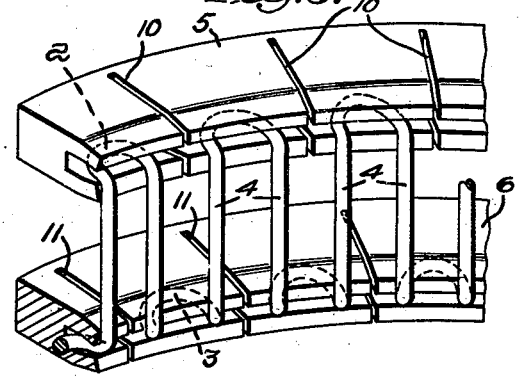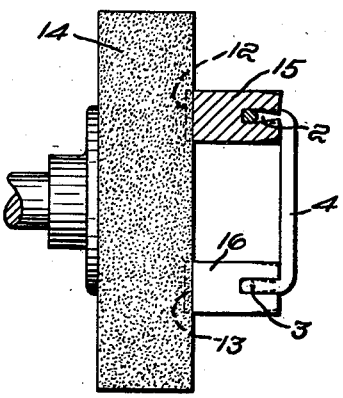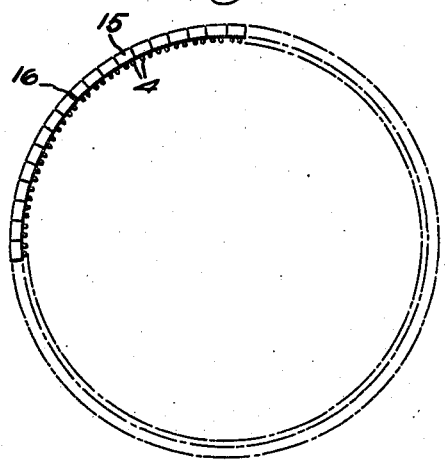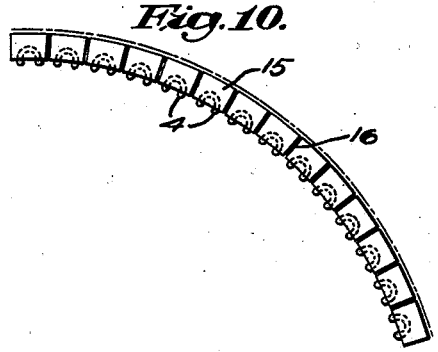

Sept. 28, 1943.　　　T. A. BOWERS　　　2,330,549
METHOD OF FABRICATING PISTON RINGS
Filed July 2, 1941　　　4 Sheets-Sheet 3
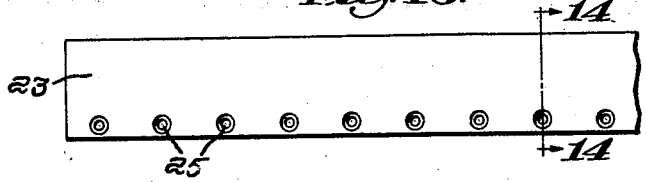
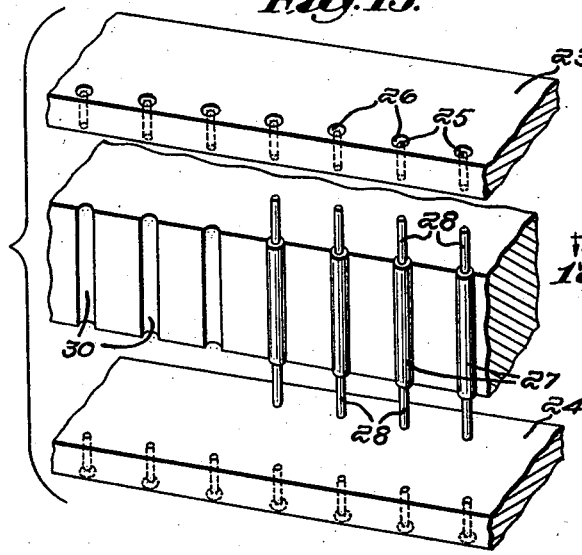
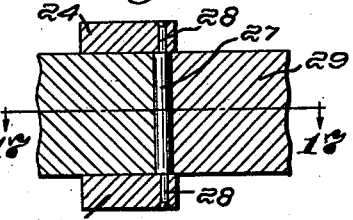
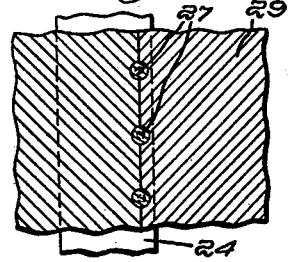
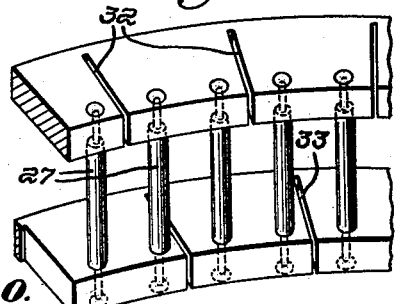
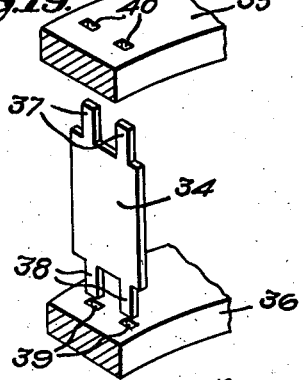
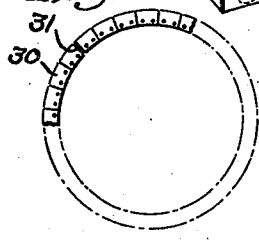

Sept. 28, 1943.  T. A. BOWERS  2,330,549
METHOD OF FABRICATING PISTON RINGS
Filed July 2, 1941  4 Sheets-Sheet 4
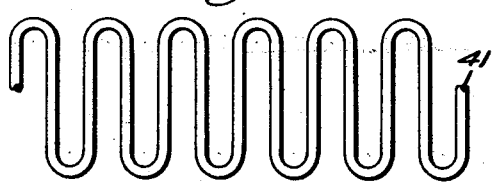
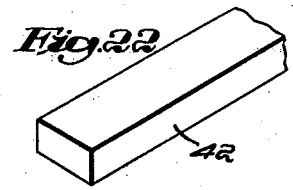
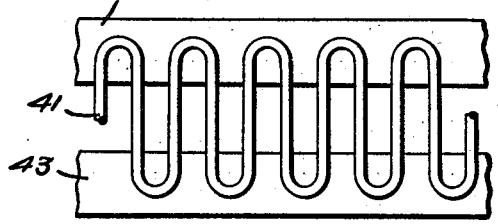
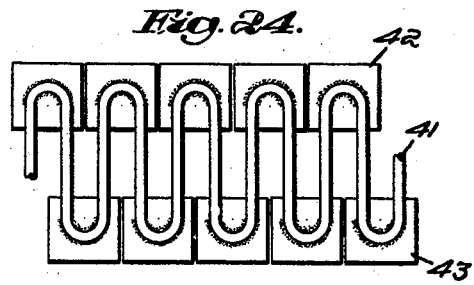
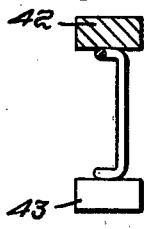
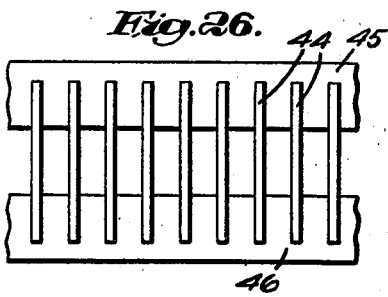
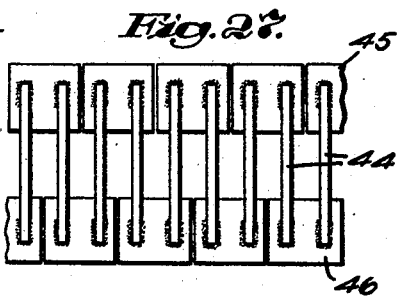
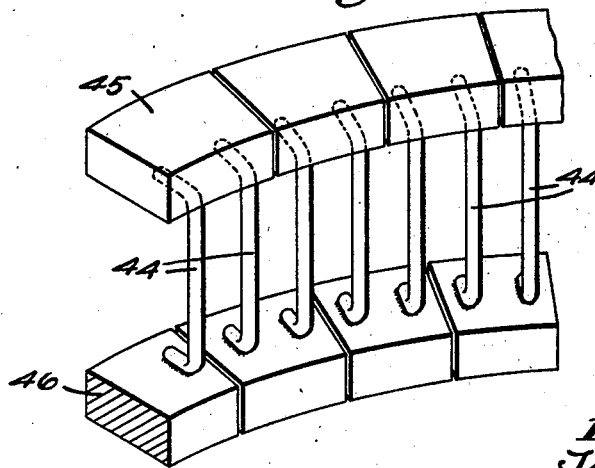
Inventor:
Thomas A. Bowers
By Munro V. Hamilton
Attorney Patented Sept. 28, 1943

2,330,549

UNITED STATES PATENT OFFICE 2,330,549

METHOD OF FABRICATING PISTON RINGS

Thomas A. Bowers, Mattapoisett, Mass., assignor to Power Research Corporation, Boston, Mass., a corporation of Massachusetts Application July 2, 1941, Serial No. 400,823

12 Claims. (Cl. 29—156.6)

This invention relates to piston rings and more especially to methods of making piston rings of sheet materials, and is a continuation in part of my co-pending applications, Ser. No. 276,503, filed May 31, 1939; Ser. No. 326,340, filed March 28, 1940, now Patent No. 2,311,728, dated February 23, 1943; and Ser. No. 332,219, filed April 29, 1940, now Patent No. 2,272,632, dated February 10, 1942.

The chief object of the invention is to improve piston rings and methods of making piston rings, and to devise methods of fabricating, from piston ring materials, composite structures generally adapted to comprising piston rings, and in particular oil control piston rings. A further object of the invention is to present novel methods of making ring portions and ring surfaces and of developing novel resilient characteristics in piston rings. Another object of the invention is to provide a method of making a piston ring from different kinds of piston ring material, with a view to combining resistance to wear and resilience with the elimination of separate hardening operations. Still another object of the invention is to provide a method of making a piston ring made up of a plurality of rows of segments spaced apart by true radial slots or openings. The invention also aims to indicate generally rapid and efficient methods of making piston rings which may be carried out with conventional tool machinery, such as punches, dies, presses and the like.

The nature of the invention, and its objects, will be further understood from the following description of the drawings and discussion relating thereto.

In the accompanying drawings:

Fig. 1 is a plan view fragmentarily illustrating a supporting member utilized in making a ring in accordance with the method of the invention.

Fig. 2 is a fragmentary perspective view illustrating a strip of piston ring material.

Fig. 3 is a plan view and partial cross section fragmentarily illustrating a step in the method of making a piston ring.

Fig. 4 is a fragmentary perspective view of a ring assembly similar to that shown in Fig. 3.

Fig. 5 is a view in end elevation and partial cross section illustrating another step in the method referred to.

Figs. 6 and 7 are cross sectional and perspective views respectively illustrating further steps in the method of making a ring.

Fig. 8 is a fragmentary perspective view illustrating still another step in the method.

Fig. 9 is a view in side elevation and partial cross section illustrating a finishing operation.

Fig. 10 is an enlarged fragmentary plan view of a finished ring.

Fig. 11 is a plan view of a complete ring.

Fig. 12 is a cross sectional view illustrating an alternate step in a method of making a piston ring.

Fig. 13 is a fragmentary plan view illustrating another type of piston ring material.

Figs. 14, 15, and 16 illustrate steps in a modified method of making a piston ring.

Fig. 17 is a cross section taken on the line 17—17 of Fig. 16.

Figs. 18 and 20 illustrate further steps in completing a ring in accordance with the modified method referred to.

Fig. 19 is a fragmentary perspective view of pieces of piston ring material illustrating a modified type of fastening operation.

Figs. 21, 22, 23, 24, and 25 illustrate still another modification of method of making a piston ring; and Figs. 26, 27 and 28 illustrate still another modified method of making piston rings of sheet metal.

Referring to the drawings, I have illustrated a number of methods of making piston rings, of which Figs. 1–12 inclusive illustrate one general method. Figs. 13–20 inclusive illustrate another method; and Figs. 21–28 illustrate still another method.

With reference to the construction included in Figs. 1–12 inclusive, numeral 1 denotes a supporting member which comprises a length of resilient metal such as steel, which is reversely folded to provide bends 2 and 3 and supporting elements 4 which are spaced apart and arranged in parallel relation to one another. A material of suitable strength is obtained from a steel wire, as for example one of .020 of an inch diameter.

In accordance with the method of the invention, the supporting member 1 is attached between strips of piston ring material 5 and 6 by inserting the bends 2 and 3 in slots 7 formed along an edge of each of the strips. The spaced-apart portions of the strips forming the sides of the slots 7 are forced toward one another, while the strips are held in parallelly disposed relation, thus tightly pinching the extremities of the bent portions in the plane of each of the strips, as is illustrated in Figs. 3 and 4.

The actual clinching operation may be carried out in any desired manner, as for example by passing the ring assembly shown in Figs. 3 and 4 between upper beveled rolls as 8 and lower beveled rolls as 9, illustrated in Fig. 5. If desired, the rolling or pinching operation may be carried out with sufficient pressure or force to partially flow the metal of the strips around the supporting member 1.

The next step in the method consists in bending the supporting elements 4 at points closely adjacent to the points of attachment of the bends 2 and 3, and in such a manner as to arrange the strips 5 and 6 in spaced-apart parallel relation to one another, as illustrated in Fig. 6 of the drawings. It will be observed that by thus bending the supporting elements substantially at right angles, the middle portions of the supporting elements 4 occur in an upright manner, with the bends 2 of one side of the supporting member occurring in staggered relation with respect to the bends 3 of the other side of the supporting member.

Thereafter the strips are bent into a circular form to provide a piston ring of some desired size. Fig. 7 illustrates the step of bending the strips 5 and 6 while supported in spaced-apart parallel relation by means of the supporting members 4. In this circular spaced-apart position, the strips are then partially severed by slots 10 and 11, which extend throughout a portion of the width of the strips from the inner periphery of the circular body outward. A feature of the method of the invention is in the particular disposition of the cuts with respect to the supporting elements 4 and their points of attachment with the strips 2 and 3.

Considering first the strip 5, the cuts 10 extend along lines of cutting which include two of the supporting elements 4 therebetween, as may be observed in Fig. 8. In the strip 6, however, the cuts 11 extend along lines of cutting which pass between the two supporting elements 4 included between the first noted cuts 10 of the strip 5. This method of cutting the strips is important in that it later provides for the formation of segments which are circumferentially and radially movable with respect to one another, as will be more fully described hereafter. The arrangement of the supporting elements in the manner noted allows any two of these elements to be attached to a single severed portion in one of the strips 5, 6, while the same two supporting elements cooperate in connecting severed portions in the other strip.

If desired, the method of forming the strips into a circular body, as illustrated in Fig. 7, may be carried out after the slots 10 and 11 have been formed in the strips. However, formation of the slots while the strips are in a curved state is preferable for the reason that radial slots formed in the circularly bent body will be of the same circumferential width throughout their length, while if these cuts are formed in a straight length of material and the material later bent, the slots will become substantially wedge-shaped.

In Fig. 9 I have illustrated a final finishing operation in the method of making a ring, consisting in removing the outer peripheral portions 12 and 13, of the bent strips 5 and 6. Preferably this may be carried out by the use of a rotating grinding wheel 14 against which the ring may be pressed. The result of this procedure is to completely separate the strips into segments 15 and 16 of the respective strips 5 and 6, with the segments being spaced apart by interstices or minute openings 16, which allow for these segments to be slightly compacted upon one another, as may be more clearly seen in Figs. 10 and 11 of the drawings.

It will be seen that the method described provides a piston ring body made up of spaced-apart annular rows of segments. The segments within a row are separated by interstices 16 and the ring may be compacted to move the segments toward each other, thus closing the interstices 16. The arrangement of the supporting elements 4, by which each pair of supporting elements for a segment of one row is attached to separate segments of an opposite row, allows the segments to be circumferentially and radially movable, the resilient character of the supporting elements tending to cause the segments to spring apart from a compacted position and thus to develop pressure against the wall of a cylinder.

In operation in a piston, the ring functions as a gapless ring with its ends adapted to abut one another, and the usual practice is to employ a size of ring which, in its expanded condition, is of a greater circumference than the circumference of the cylinder in which the ring is to be installed. By so doing the ring is held in the cylinder in a compacted condition and tends to exert a radial pressure outwardly against the cylinder wall. This pressure allows the ring to conform to various irregularities in a cylinder wall surface and at the same time to exert a uniform pressure all the way around the cylinder wall and throughout all positions in the cycle of movement of the piston in the cylinder.

The method of making the ring affords several advantages. By using separate pieces of material, it is possible to employ a relatively hard steel for the strips 5 and 6 of a character particularly adapted to functioning with the metal of which a cylinder wall may be composed and directed to resisting wear. The supporting elements, on the other hand, may be formed of a tough, resilient steel, chiefly designed to develop springiness rather than resistance to wear.

It is pointed out that in obtaining proper toughness and resilience in metal, there may develop resistance to punching, shearing or cutting operations, such as the formation of the slots 10 and other kinds of cuts. By using the different kinds of metal, this difficulty is avoided. The method also affords the advantage that cuts, such as the cuts 10, may be carried out at various stages in the method of making the ring. For example, the cuts may be formed in the strips before their attachment to the supporting member, or they may be formed after attachment but while the supporting member is still in a flat state. Also, the cuts may extend radially all the way across the strips so that the segments are separated without any grinding operations. Still other changes in the method illustrated by Figs. 1–12 inclusive may be resorted to, such as resorting to other means of arranging steel strip material in attached relation to a reversely bent supporting structure. Fig. 12, for instance, illustrates a method of mounting a supporting member 17 in a sand mold 18, supported in a container 19, having openings 20 for allowing molten metal to be poured into the mold 18 to form the strips 21 and 22 which set around the supporting member 17.

Figs. 13–20 inclusive illustrate a method of making a piston ring from two strips of piston ring material, generally characterized by a process of attaching to spaced-apart strips separate supporting elements, as compared with a continuous supporting element as illustrated in Figs. 1–12 inclusive.

For example, strips 23 and 24 may be provided with openings 25 extending through the strips and having outer enlarged apertures 26. In these openings are secured supporting elements 27 which constitute pins having reduced end portions 28 adapted to be engaged through the openings 25 and be flattened out in a rivet-like fashion, as illustrated in Fig. 16.

Any suitable method of attaching the pins may be resorted to, such as that illustrated in the drawings in which a block member 29 is provided with openings 30 adapted to receive a plurality of the supporting elements 27. The block 29 also acts as a spacing member for supporting the strips 23 and 24 while the pins are passed through the slots 25 and flattened over in the countersunk openings 26.

Thereafter the strips may be partially severed by openings 32 and 33, and bent around into a circular form. Removing the unsevered portions by grinding as above noted provides segments 30, spaced apart by means of interstices 31 as illustrated in Fig. 20. The resilient elements 27 are alternately arranged between the segments to maintain the segments in circumferentially movable relation.

Fig. 19 illustrates a slightly modified type of supporting element 34 which consists of a wall member extending throughout a substantial part of the radial width of strips 35 and 36, and preferably having projecting ends 37 and 38 adapted to engage in openings 39 and 40 of the strips. Supporting elements as 34 are intended to furnish increased stiffness to the ring by preventing the top and bottom sides of the ring from flexing toward one another in an axial direction. The advantages already referred to in connection with the method illustrated in Figs. 1–12 inclusive are also pertinent with respect to the methods illustrated in Figs. 13–20 inclusive.

Figs. 21–28 inclusive illustrate another modified method of making a multi-piece piston ring in which a supporting member 41 is secured by some suitable means, as welding, at the sides of strips 42 and 43, as particularly illustrated in Fig. 24.

It is intended that a welding operation may be carried out by means of a welding wheel which moves continuously over a supporting member as 41, disposed on parallelly arranged strips 42 and 43 as shown. The supporting strip is then bent at right angles in the manner already described to provide a structure such as that shown in Fig. 25, and this structure may be separated into segments which are arranged in annular rows to form a piston ring in the manner already outlined.

If desired, the welding operation may be slightly modified by using separate supporting elements 44 which are secured to strips 45 and 46. A piston ring is obtained by bending the supporting elements 44, cutting the segments 45, and arranging the segments in annular rows, as illustrated in Fig. 23. Various other changes and modifications may be resorted to.

While I have shown a preferred embodiment of my invention, it should be understood that various changes and modifications may be resorted to, in keeping with the spirit of the invention as defined by the appended claims.

I claim:

1. That improvement in methods of making piston rings which comprises attaching to spaced-apart parallelly arranged strips of piston ring material a plurality of supporting portions of a second piston ring material, then cutting one of the strips along lines of cutting which extend transversely of the strips to form a plurality of separated segments, each of which includes two of the said supporting elements attached thereto, and cutting the other of the strips along lines of cutting which extend transversely between the said first lines of cutting.

2. That improvement in methods of making a piston ring which comprises securing between the edges of two spaced-apart parallelly arranged strips of piston ring material a plurality of supporting portions of a second piston ring material, then cutting one of the strips along transverse lines of cutting which form segments having two of the supporting elements included therewith, cutting a second strip along transverse lines of cutting to form segments which include two adjacent supporting elements which are attached to separate segments of the said first strip bending the strips into a circular shape.

3. That improvement in methods of making piston rings which comprises securing between two spaced-apart parallelly arranged strips of piston ring material a plurality of supporting portions of a second piston ring material, then cutting one of the strips along transverse lines of cutting which include two of the supporting elements, cutting the second strip along transverse lines of cutting which pass between any two of the supporting elements included between the said first lines of cutting said lines of cutting extending from one edge of each of the respective strips to a point within an opposite edge of each of the said strips bending the strip into a circular shape and grinding the circularly bent strips to remove outer peripheral portions and extend the lines of cutting throughout the radial width of the strips.

4. That improvement in methods of making piston rings which comprises securing between two spaced-apart parallelly arranged strips of piston ring material a plurality of supporting portions of a second piston ring material, partially cutting one of the strips along transverse lines of cutting which include two of the supporting elements, partially cutting the second strip along transverse lines of cutting which pass between any two of the supporting elements included between the said first lines of cutting, bending the strips into a circular shape, and then removing portions from each of the outer peripheries of the circularly bent strips to form rows of separated segments.

5. That improvement in methods of making piston rings which comprises securing between two spaced-apart parallelly arranged strips of piston ring material a plurality of supporting portions of another piston ring material, then bending the supporting portions to arrange the strips in a substantially parallel spaced-apart relationship at right angles to the supporting elements, bending the strips into a circular form, then cutting one of the strips along transverse lines of cutting which include two of the supporting elements, and cutting the second strip along transverse lines of cutting which pass between any two of the supporting elements included between the said first lines of cutting.

6. That improvement in methods of making piston rings which comprises securing between two spaced-apart parallelly arranged strips of piston ring material a plurality of separated supporting portions of another piston ring material, then bending the supporting portions to arrange the strips in spaced-apart parallel planes at right angles to the supporting elements, then partially cutting one of the strips along transverse lines of cutting which include two of the supporting elements, partially cutting the second strip along transverse lines of cutting which pass between any two of the supporting elements included between the said first lines of cutting, bending the strip into a circular shape, and removing outer peripheral portions of the circularly shaped strips to separate the said segments throughout the radial width of the ring.

7. That improvement in methods of making piston rings which comprises securing between two spaced-apart parallelly arranged strips of piston ring material a plurality of supporting portions of another piston ring material, cutting one of the strips along lines of cutting which extend for a portion only of the transverse width of the strip and which include two of the supporting elements, cutting the second strip along lines of cutting which extend throughout a portion only of the transverse width of the strip and which pass between any two of the supporting elements included between the said first lines of cutting, bending the supporting portions along two lines of bending which are spaced apart from one another, each of said lines of bending occurring in spaced-apart parallel relation with respect to inner edges of the said strips, said bending being carried out to a point at which the said strips extend outwardly at right angles to intermediate parts of the supporting portions to form a U-shaped body, bending the U-shaped body thus obtained into an annular position and cutting away outer peripheral edges of the strips through a radial distance sufficient to provide for separation of the strips into segments measured by the said transversely disposed cuts.

8. That improvement in methods of making piston rings which comprises securing between two spaced-apart parallelly arranged strips of piston ring material a plurality of supporting portions of another piston ring material, bending the supporting portions along spaced-apart lines of bending, each of which occurs in parallel spaced-apart relation with respect to inner edges of the strips, said bending being carried out to a point at which the strips extend outwardly at right angles to mid parts of the supporting portions to form a generally U-shaped body, then cutting one of the strips along lines of cutting which extend for a portion only of the transverse width of the strip and which include two of the supporting elements, and cutting the second strip along lines of cutting which extend throughout a portion only of the transverse width of the strip and which pass between any two of the supporting elements included between the said first lines of cutting, then bending the strips into a circular form and grinding the outer peripheries of the circularly formed strips to remove those portions which are not severed by the said cuts.

9. That improvement in methods of making piston rings which comprises separately securing a plurality of separate supporting elements to spaced-apart parallelly arranged strips of piston ring material, bending the supporting elements at right angles along spaced-apart lines of bending, each of which occurs in parallel spaced-apart relation with respect to inner edges of the said strips of piston ring material to arrange the strips in a position such that the supporting elements occur between the edges of the strips, bending the strips into a circular form, cutting the strips transversely along lines of cutting which are spaced apart throughout the strips to provide segments, each of said segments being attached to two supporting elements.

10. That improvement in methods of making piston rings which comprises providing two strips of piston ring material, fastening through each of the strips of material and between their edges a plurality of spaced-apart supporting elements, said supporting elements extending at right angles to the said strips of piston ring material and adapted to arrange the strips in parallel relation with respect to one another, partially cutting one of the strips along transverse lines of cutting which include two of the supporting elements and partially cutting the second strip along transverse lines of cutting which pass between any two of the supporting elements included between the said first lines of cutting, bending the strips into an annular body and then grinding outer edges of the annular body throughout a part of the radial width thereof to provide segments which are circumferentially spaced apart.

11. That improvement in methods of making piston rings which comprises providing two strips of piston ring material, forming a plurality of spaced-apart openings extending through the strips and occurring between the edges thereof, fastening a plurality of supporting elements through the openings of the strips, said supporting elements extending at right angles to the said strips and adapted to maintain them in parallel relation to form a U-shaped body, bending the strips into circular form, cutting one of the strips along transverse lines of cutting to form segments, each of which is attached to two of the supporting elements, and cutting the second strip along transverse lines of cutting which pass between any two of the supporting elements included between the said first lines of cutting.

12. That improvement in methods of making piston rings which comprises providing a reversely bent wire, said wire including a plurality of parallelly arranged supporting elements, inserting the bent portions of the wire member in grooves formed along edges of two parallelly arranged strips of piston ring material, forcing together the sides of the grooves into clinched relationship with the ends of the wire member, then bending the parallelly arranged supporting portions of the wire along spaced-apart lines of bending to arrange the strips flatwise in spaced-apart parallel planes, cutting one of the strips along transverse lines of cutting to form partially severed segments which are attached to two of the supporting portions, then cutting the second strip along transverse lines of cutting which pass between any two of the supporting portions included between the first lines of cutting, said lines of cutting extending from one edge of each of the respective strips to a point within an opposite edge thereof, bending the partially severed strips and supporting portions from a substantially straight length into a circular form, and grinding the outer peripheral edges of the partially severed segments to remove material in the strips occurring between such outer peripherial edges and the extremities of the lines of cutting.

THOMAS A. BOWERS